United States Patent [19]

Sinkhorn et al.

[11] 4,312,465
[45] Jan. 26, 1982

[54] HANDLEBAR MOUNTED CAN HOLDING DEVICE

[76] Inventors: Herman L. Sinkhorn, P.O. Box 665, King City, Mo. 64463; George T. Sinkhorn, Rte. 1, Box 1B, Mound City, Mo. 64470

[21] Appl. No.: 195,793

[22] Filed: Oct. 10, 1980

[51] Int. Cl.³ ............................. B65D 25/00; B62J 7/06
[52] U.S. Cl. .................................... 224/36; 220/85 H
[58] Field of Search ............. 224/30 A, 32 R, 35, 224/36, 41, 276, 282; 280/289 A, 289 H; 220/85 H, 90.4

[56] References Cited

U.S. PATENT DOCUMENTS

| | | | |
|---|---|---|---|
| 591,390 | 10/1897 | Dunnigan | 224/36 |
| 1,134,577 | 4/1915 | Apple | 224/36 |
| 2,209,846 | 7/1940 | Pawsat | 224/36 |
| 3,013,691 | 12/1961 | Prentice | 220/85 H |
| 3,107,029 | 10/1963 | Rylander | 220/85 H |
| 3,719,305 | 3/1973 | Pressnell | 220/85 H |
| 3,840,153 | 10/1974 | Devlin | 224/32 R X |
| 4,071,175 | 1/1978 | Wagnon | 224/36 |

Primary Examiner—Steven M. Pollard
Attorney, Agent, or Firm—Lowe, Kokjer, Kircher, Wharton & Bowman

[57] ABSTRACT

A device which attaches to a motorcycle or bicycle handlebar to hold a beverage can. The device has a hollow body which is clamped to the handlebar and a hinged lid which engages the top of the beverage can to maintain it in place in the body. The lid can be raised for removal of the can from the body.

2 Claims, 4 Drawing Figures

HANDLEBAR MOUNTED CAN HOLDING DEVICE

BACKGROUND AND SUMMARY OF THE INVENTION

This invention deals with a handlebar attachment which serves to hold beverage cans.

In order to permit motorcycle and bicycle riders to enjoy beverages while riding, various types of can holding devices have been proposed, as exemplified by U.S. Pat. No. 4,071,175 to Wagnon. Devices of this type provide handlebar mounted containers in which beverage cans can be temporarily stored between drinks. However, such devices have not enjoyed widespread acceptance or commercial success for a number of reasons, primarily because they do not hold the beverage cans securely enough to avoid rattling of the can and spilling of the contents. The can is capable of shifting around in the holder and is thus shaken and spilled when bumps and other rough spots are encountered by the motorcycle or bicycle. It is possible for the beverage can to fall completely out of the holder when particularly uneven terrain is encountered. In addition, the can holding devices sometimes move on the handlebar due to the insecure manner in which they are clamped or otherwise attached thereto. Existing can holders are further characterized by excessive cost and undue complexity, as well as being difficult and time consuming to attach to and remove from the handlebar.

The present invention provides a simple handlebar mounted can holding device which is a significant improvement compared to existing devices having the same purpose. In accordance with the invention, a hollow body suitable for receiving a standard beverage can has a C-clamp arrangement which permits it to be easily and securely attached to the handlebar of a motorcycle or bicycle. The body has a drain hole in the bottom and a split ring at the top for gripping of the side wall of the can. The can projects upwardly out of the body of the device and is engaged at the top by a hinged lid which serves to securely maintain the can in a stable position to avoid spilling of its contents when rough terrain is being traversed. The lid can be pivoted upwardly for insertion or removal of the can, and detents or any other suitable arrangement may be provided to hold the lid in the raised position and also in the lowered position.

DETAILED DESCRIPTION OF THE INVENTION

In the accompanying drawing which forms a part of the specification and is to be read in conjunction therewith and in which like reference numerals are used to indicate like parts in the various views.

Figure 1:
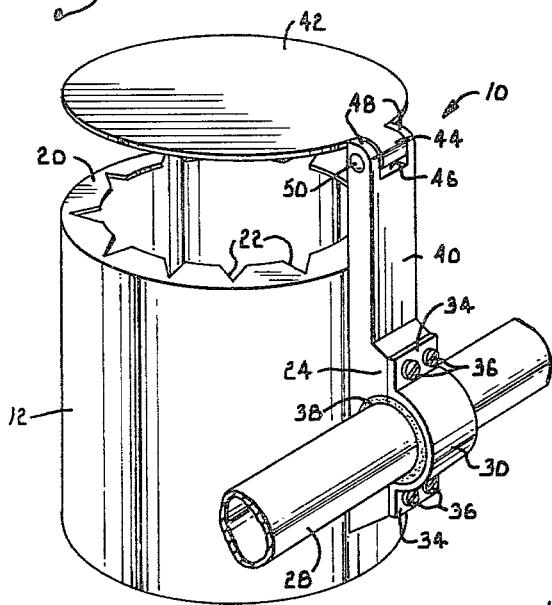
FIG. 1 is a perspective view of a can holding device constructed according to the present invention and illustrating the device mounted on a handlebar which is shown only fragmentarily.

Referring now to the drawings in more detail, reference numeral 10 generally designates a can holding device constructed in accordance with a preferred embodiment of the present invention. The device 10 includes a hollow cylindrical body 12 having a flat bottom 14 with a drain hole 16 in its center. The body 12 is large enough in diameter to easily receive standard sized beverage cans such as the can 18 shown in phantom in FIG. 2. The height of the body is such that when the can rests on the bottom 14, the upper portion of the can projects well above the top of the body.

Figure 2:
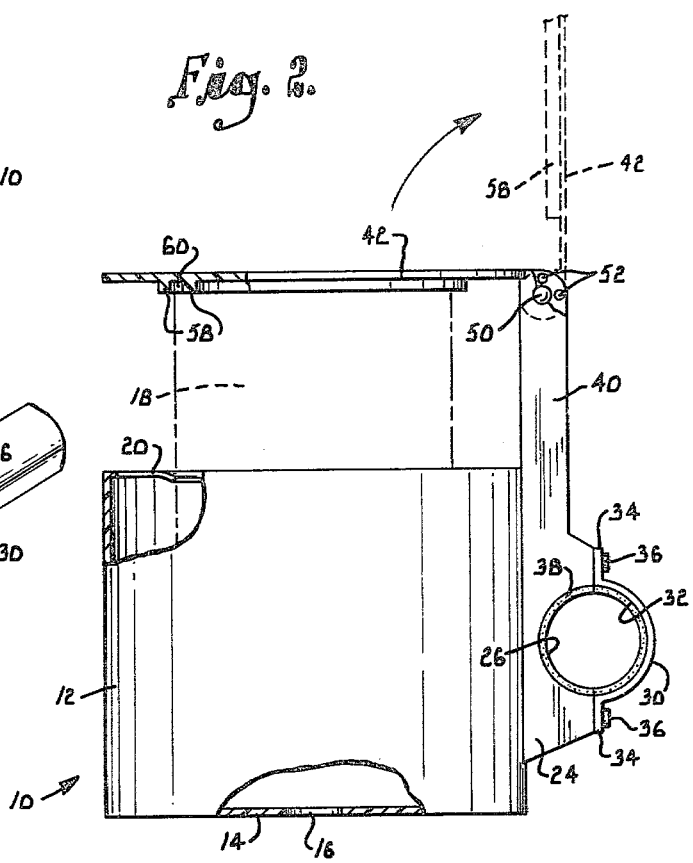
FIG. 2 is a side elevational view of the can holding device, with portions broken away for illustrative purposes and the broken lines showing the lid in its raised position.

A flexible ring 20 having a plurality of V-shaped notches 22 is mounted on the upper rim of body 12. Ring 20 is constructed of a resilient material and projects inwardly from the top edge of the body and engages the side wall of an inserted can in a manner to grip the can to prevent it from shifting excessively within the body. The notches 22 provide ring 20 with sufficient flexibility for adequate gripping of cans of various sizes. When a can is inserted in the body, ring 20 deflects slightly as shown in FIG. 2 in order to firmly grip the side wall of the can.

Body 12 is preferably formed from a hard plastic substance and has a generally rectangular boss 24 formed integrally on its side wall. The outer surface of boss 24 is provided with a semicircular recess 26 having substantially the same radius as that of a standard handlebar 28 (FIG. 1) such as that of a bicycle or motorcycle. Boss 24 and its recess 26 forms half of a clamp which is used to mount body 12 on the handlebar 28. The other half of the clamp is formed by a generally C-shaped clamp element 30 presenting a semicircular recess 32 that cooperates with recess 26 to closely surround handlebar 28 when applied thereto. Clamp element 30 has upper and lower lugs 34 suitable for receiving screws 36 that are threaded into the surface of boss 24. In this fashion, body 12 is tightly clamped to the handlebar. Each of the recesses 26 and 32 is provided with a lining 38 which is constructed of a high friction material in order to tightly grip against the handlebar to prevent the device from moving thereon.

Formed integrally with boss 24 and the side wall of body 12 is a vertical post 40 which projects upwardly from the boss above the top of body 12. Post 40 serves to mount a hinged lid 42 at a location well above the upper end of the body. The lid 42 is in the form of a flat disc having a lug 44 on its periphery. Lug 44 is received closely in a recess 46 located between a pair of spaced apart ears 48 formed on the upper end of post 40. A pin 50 extends through ears 48 and lug 44 to mount lid 42 to the post in a manner permitting the lid to pivot through a 90° arc between the lowered position shown in solid lines in FIG. 2 and the raised position shown in broken lines in FIG. 2.

Figure 3:
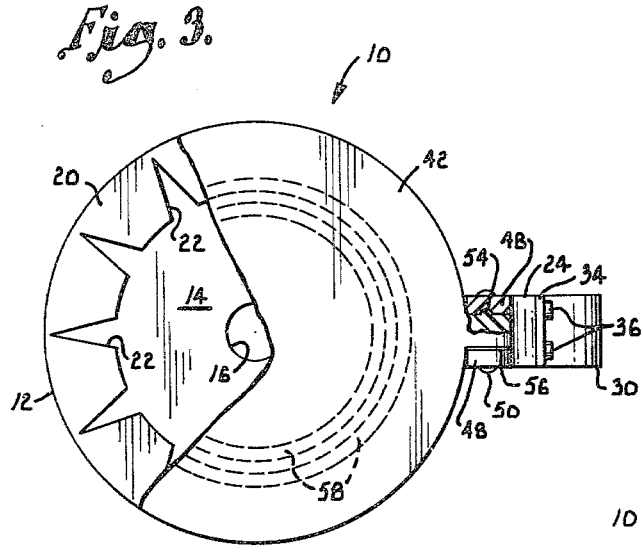
FIG. 3 is a top plan view of the can holding device, with portions broken away for illustrative purposes.
Figure 4:
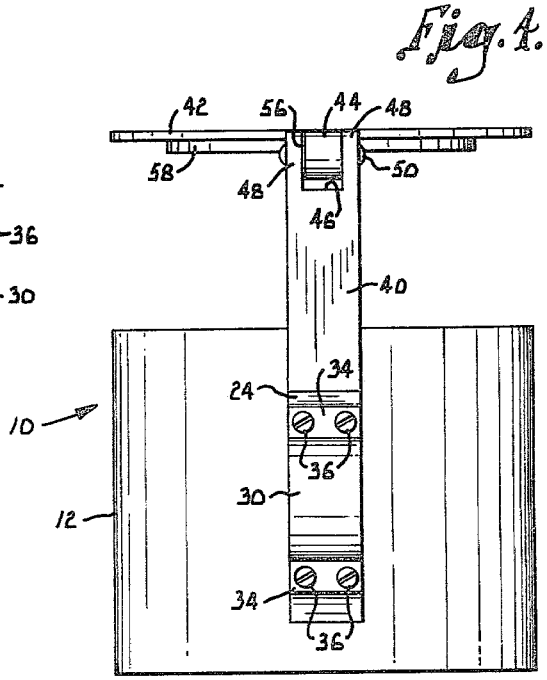
FIG. 4 is a front elevational view of the can holding device.

A detent arrangement serves to temporarily hold lid 42 in both the raised and lowered positions. A pair of small recesses 52 (see FIG. 2) are formed in the inside surface of one of the ears 48. Recesses 52 are spaced apart from one another at a ninety degree interval measured about the axis of pin 50 at the center. A small bead 54 (FIG. 3) is formed on one side of lug 44. Bead 54 is located to fit closely in one of the recesses 52 when the lid is in the lowered position and in the other recess 52 when the lid is moved to the raised position. A small leaf spring 56 (FIGS. 3 and 4) is disposed between lug 44 and the opposite ear 48 in order to urge lug 44 in a direction causing bead 54 to enter one of the recesses 52 when the lid is in the raised or lowered position.

The bottom surface of lid 42 is provided with a pair of circular lips 58 which are located to closely receive the upper flange 60 of can 18 between them when lid 42 is in the lowered position. When the lid is lowered, it engages the top of the can and engages flange 60 between lips 58 in order to prevent the can from shifting within the body 12.

In use, the can holding device 10 is attached to handlebar 28 by applying boss 24 and clamp 30 to the handlebar and tightening the screws 36. When the screws have been tightened, the friction lining 38 tightly grips the handlebar in order to prevent the device from moving lengthwise on the handlebar or pivoting about its axis.

To insert a beverage can into the device between drinks, lid 42 is normally raised to the position shown in broken lines in FIG. 2, and the can can then be inserted into body 12. The lid is then lowered to the solid line position of FIG. 2 wherein it engages the top of the can and the upper flange 60 is closely received in the annular space presented between lips 58. The combined action of ring 20 and lid 42 prevents the can from rattling or spilling its contents even when rough terrain is encountered. The fit of bead 54 in recess 52 holds lid 42 down on top of the can while permitting it to be raised when another drink is to be taken. The detent arrangement similarly holds the lid in its raised position while the can is out of the device. The drain hole 16 effects draining off of any rain water or other liquid that enters body 12.

It is important to recognize that the can 18 projects upwardly well out of body 12 so that enough surface is exposed to permit it to be easily gripped for removal from the body. Even though the beverage can projects upwardly out of the body, it is firmly held in place due to the provision of the hinged lid 42. Lid 42 is large enough to cover the top of the can and occupies a horizontal plane in the lowered position and a vertical plane in the raised position.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A can holding device attachable to a handlebar for holding beverage cans of various sizes, said device comprising:
   a hollow body of sufficient size to accommodate beverage cans of various sizes therein with an inserted can projecting upwardly out of the body, said body terminating in an upper rim;
   a bottom surface of said body for receiving the bottom of an inserted can;
   yieldable means on said body for resiliently contacting the side wall of an inserted can around the periphery thereof in a manner holding the can against lateral movement in the body;
   clamp means for securing said body to the handlebar;
   a stanchion extending from said body above the upper rim thereof;
   a lid mounted on said stanchion at a location spaced above said rim for pivotal movement between a lowered position wherein the lid engages the top of an inserted can to hold the can against said bottom surface and a raised position wherein the lid is disengaged from the can to permit removal of same from said body; and
   detent means for temporarily holding said lid in the lowered position and in the raised position.

2. A device as set forth in claim 1, wherein the inserted beverage can has a flange on the top thereof and said lid includes a pair of spaced apart lips closely receiving said flange therebetween in the lowered position of the lid.

* * * * *